(12) United States Patent
Eaton

(10) Patent No.: US 6,380,911 B1
(45) Date of Patent: Apr. 30, 2002

(54) RACE POSITION TRACKING PYLON

(76) Inventor: Robert S. Eaton, 4107 Houx, Bacliff, TX (US) 77518

( * ) Notice: Subject to any disclaimer, the term of this patent is extended or adjusted under 35 U.S.C. 154(b) by 0 days.

(21) Appl. No.: 09/314,325

(22) Filed: May 19, 1999

(51) Int. Cl.$^7$ ................................................ G09G 3/00
(52) U.S. Cl. .............................. 345/30; 345/33; 345/39; 345/48; 463/6; 463/60; 463/59
(58) Field of Search .............................. 345/30, 39, 33, 345/48

(56) References Cited

U.S. PATENT DOCUMENTS

| | | | | |
|---|---|---|---|---|
| 3,648,454 A | * | 3/1972 | Morrison | 368/2 |
| 4,527,798 A | * | 7/1985 | Siekierski et al. | 463/17 |
| 4,605,229 A | * | 8/1986 | McKay | 463/59 |
| 4,872,680 A | * | 10/1989 | Dennis | 463/59 |
| 5,367,286 A | * | 11/1994 | Voillat | 340/323 R |
| 5,593,047 A | * | 1/1997 | Haugen | 211/58 |
| 6,155,927 A | * | 12/2000 | Levasseur et al. | 463/42 |
| 6,155,928 A | * | 12/2000 | Burdick | 463/46 |

* cited by examiner

Primary Examiner—Mark Zimmerman
Assistant Examiner—Mackly Monestine
(74) Attorney, Agent, or Firm—Conley, Rose & Tayon, P.C.

(57) ABSTRACT

A race standings display is disclosed having a base which supports a square, vertical tower. A series of two-digit LED number displays is arranged vertically along the tower, showing first elapsed time (four digits for this display), then a lap count, and then competitor numbers in order of their position in the race. Optionally, red, green and yellow LEDs may be provided to indicate the status of the race (e.g. yellow for racing under a caution flag). The back of the standings display pylon is provided with connectors for power and a phone line, and optionally, connectors for a 10 keyboard and monitor. A computer or microcontroller in the standings display is programmed to establish a phone connection to a real-time database (preferably via the internet), and is programmed to automatically update the standings display during the progress of the race. During times when a race is not in progress, the standings display may act as a regular clock and display car numbers in order of current point standings. In an alternate embodiment, the controller in the as standings display is programmed to update the display in response to infrared signals from a manually-operated remote control. In another embodiment, the standings display has a series of backlit windows over which numbers may be placed to emulate in manual fashion the above described embodiment. In yet another embodiment, the standings display is constructed as a soft-sculpture (molded, cloth-covered foam) with Velcro attachments for numbers.

14 Claims, 3 Drawing Sheets

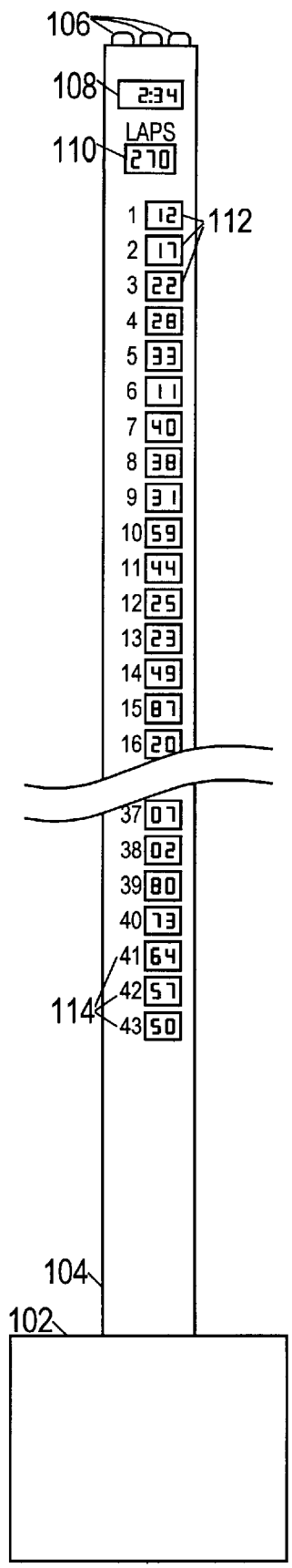
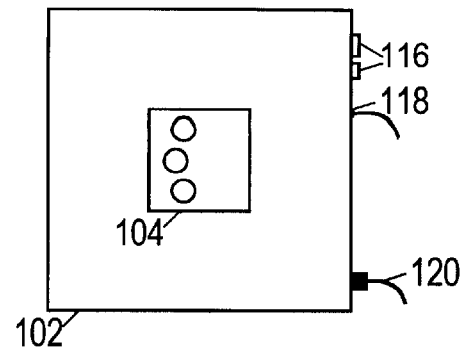
FIG. 2
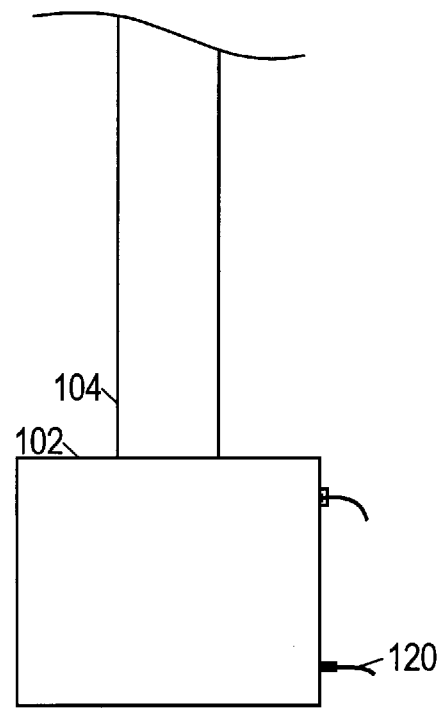
FIG. 3
FIG. 1

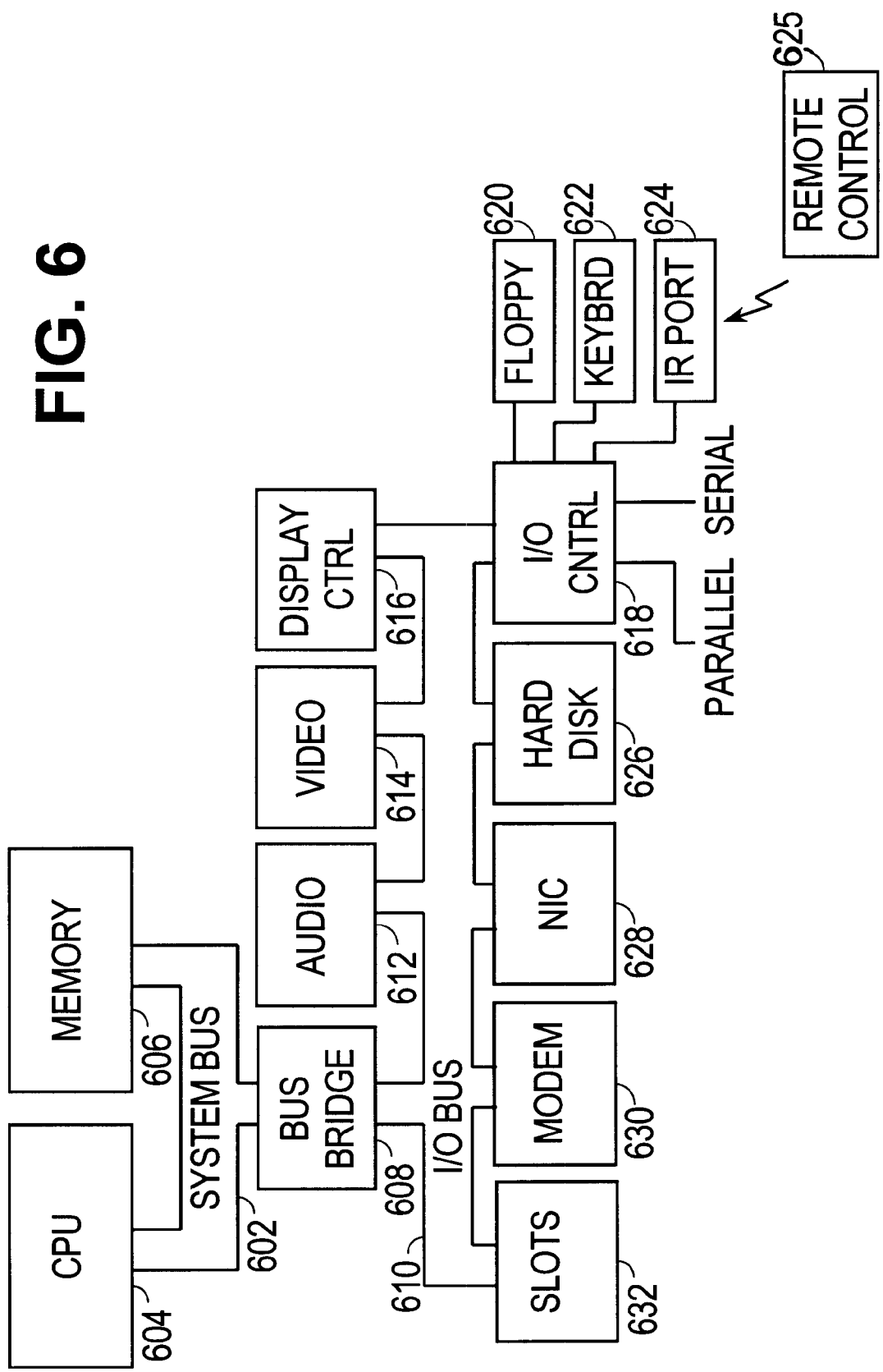

RACE POSITION TRACKING PYLON

BACKGROUND OF THE INVENTION

1. Field of the Invention

The present invention generally relates to raceway scoring systems, and more particularly relates to a raceway scoring system for use away from the raceway.

2. Description of the Related Art

Many professional sports owe a large portion of their success to avid fans who attend regularly or tune in to broadcast events whenever possible. Such fans also promote the sport by joining clubs, subscribing to fan magazines, purchasing sports memorabilia, and engaging in other activities that allow them to get involved in the sports events. Racing is one such sport that enjoys a loyal and enthusiastic following.

Consider for example the success of NASCAR racing. In 1998 there were over 6 million active adult collectors of racing memorabilia, and sales of NASCAR collectibles grossed just under one billion dollars. NASCAR's television ratings are the fastest growing of any sport. In fact, NASCAR is making plans to start a 24 hour television network dedicated to racing, and they expect to reach as much as $300 million dollars per year in revenue within the decade. Over 60 Winston Cup team fan clubs are known to exist, and several other popular clubs and publications exist primarily for marketing racing collectibles.

Scores at racing events are ultimately determined according to the order in which the competitors complete the event, subject to certain rules concerning potential disqualification. Accordingly, one way to track the progression of a racing event is to establish a list of the competitors in order of their status relative to completion of the event. The competitor closest to completion is preferably listed first, the next-closest competitor listed second, the third closest listed third, etc. Such a list may be referred to as a ranking, the positions, or "the standings". It may be preferred to list only a limited number of those competitors with the highest rankings, or it may be desired to provide a complete rankings list.

Systems for generating such lists are provided at many racing events where they can be viewed by the attendees. However, those not in attendance are largely unable to consult these systems, and consequently are unable to monitor the race in a timely fashion. Additionally, any information which is obtainable during the event typically concerns only those competitors in the top few standings. Consequently, the non-attendee fans would benefit from a commercially available standings display system that can be configured to display timely information during the event. The increased availability of timely information during events may be expected to promote the popularity of racing and benefit the sport as a whole.

SUMMARY OF THE INVENTION

Accordingly, a standings display system that can be used by individuals and small businesses to provide timely standings information during a race is herein disclosed. In one embodiment, the standings display includes a tower having an array of competitor number displays arranged vertically along the tower. The competitor number displays are configured to show competitor numbers in an order that indicates competitor positions during a race. The tower may also have a time display to show elapsed time during the race, a lap display to show the number of laps completed during the race, and a flag status display to show a current race condition. The standings display may be controllable via a handheld remote control. Preferably, the standings display includes a microcomputer with modem, and is configured to establish a dial-up connection to the internet for communicating with an information server. The standings display then receives regularly-updated information from the information server, and accordingly displays the latest standings. The standings display may be configured to monitor the phone line for evidence of incoming or outgoing calls, and may be configured to terminate any established connection and allow such calls to proceed normally. Upon detecting the completion of such calls, the standings display may automatically re-establish the dial-up connection.

BRIEF DESCRIPTION OF THE DRAWINGS

A better understanding of the present invention can be obtained when the following detailed description of the preferred embodiment is considered in conjunction with the following drawings, in which:

FIG. 1 is a front view of a preferred embodiment of a standings display;

FIG. 2 is a plan view of a preferred embodiment of a standings display;

FIG. 3 is a side view of a preferred embodiment of a standings display;

FIG. 6 is a block diagram of a microcomputer for a standings display.

Figure 4:
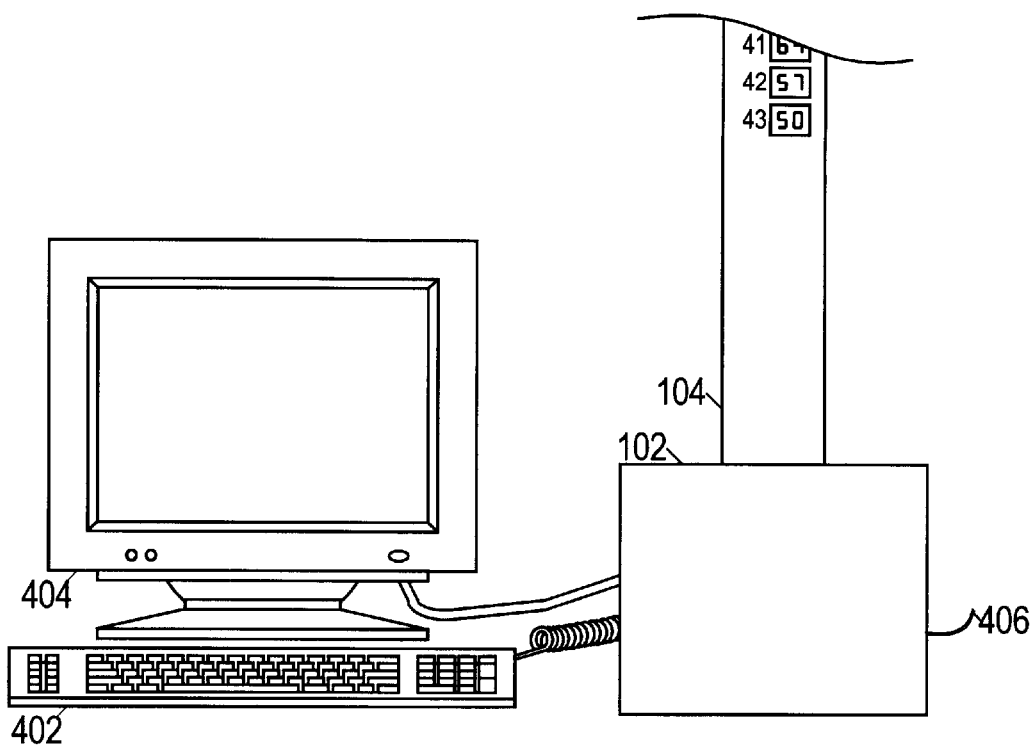
FIG. 4 shows a standings display in a first configuration.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the figures, FIGS. 1–3 show a first embodiment of an operable standings display system 100. Standings display system 100 includes a base 102 that supports a vertical tower 104. The contemplated height of the tower 104 ranges from two to eight feet, but other heights may be employed. Base 102 and tower 104 preferably have square cross-sections when viewed from above (FIG. 2), but other shapes are also contemplated, including triangular, rectangular, circular, and elliptical. Base 102 may be weighted to provide increased stability.

Tower 104 preferably has various race status display components mounted on it, including lamps 106, a time display 108, a lap display 110, and a vertical array of competitor number displays 112. Lamps 106 preferably indicate the current flag status of the race. For example, lamps 106 may include red, yellow, and green colors that are illuminated to indicate "not racing", "caution flag", and "normal competition", respectively. Time display 108 preferably displays elapsed race time during a race. At other times, time display 108 may be configured for other purposes, e.g. to display normal time or to display countdown time to the next race. Lap display 110 preferably displays the number of laps completed by the race leader. It is noted that the positions of these various display components may be changed in various embodiments. In particular, it may be preferred to position the lamps 106 on the front of tower 104 over the time display 108 for embodiments that include an advertising display on the top of the tower.

Competitor number displays 112 are preferably labeled with corresponding position numbers 114. For each position number 114, the associated competitor number display 112 preferably displays the number of the competitor currently holding that position. It is noted that each competitor is assigned a competitor number before the racing event. For many racing sports, the competitor is allowed to keep the same number for all events. For these sports, the competitor number displays 112 may display competitor numbers in order of current point standings when a race is not in session. Preferably, the user also has the option of completely specifying which numbers are to appear in which positions.

Display components 108, 110 and 112 are preferably implemented as seven-segment digit LEDs (light-emitting diodes). Lamps 106 may also be implemented using LEDs. but preferably are implemented as incandescent bulbs behind suitably colored shells. Other display implementations are also contemplated including, e.g. LED pixel displays, liquid crystal displays (LCDs), raster displays, neon digit displays and electronic ink. A microcontroller or microcomputer (or other suitable control circuit) is preferably provided in display 100 for controlling display components 106–112. All display components are preferably updated regularly during a racing event.

Race status information may be provided to the standings display 100 in a variety of contemplated ways. In a preferred method, the standings display 100 is configured to automatically connect to the internet and retrieve information from the manufacturer's website. This method is described in further detail below. The standings display 100 may additionally or alternatively be provided with the information manually. For example, the display 100 may be programmed by an infrared remote control. On a remote control, arrow buttons may be used to select a position and number buttons may be used to enter the desired values.

FIG. 2 shows base 102 having connector(s) 116, phone jack 118, and power plug 120 mounted on the reverse side. Base 102 preferably includes a microcontroller or microcomputer (discussed further with reference to FIG. 6) and a power supply (not shown). As shown in FIG. 4, the display 100 may couple to a user input device 402, a monitor 404, and a phone line 406 via the connectors 116 and phone jack 118. Input device 402 and monitor 404 may preferably be used only to initially configure the display 100, and may thereafter be removed. The configuration information is preferably sufficient to allow the display 100 to automatically establish a connection over phone line 406 after being powered on. This information may include a phone number, user name, and password for the user internet service provider (ISP). In this manner, display 100 may be configured to automatically retrieve messages that specify current race status. As discussed further below the microcomputer interprets the messages and configures display 100 accordingly.

Figure 5:
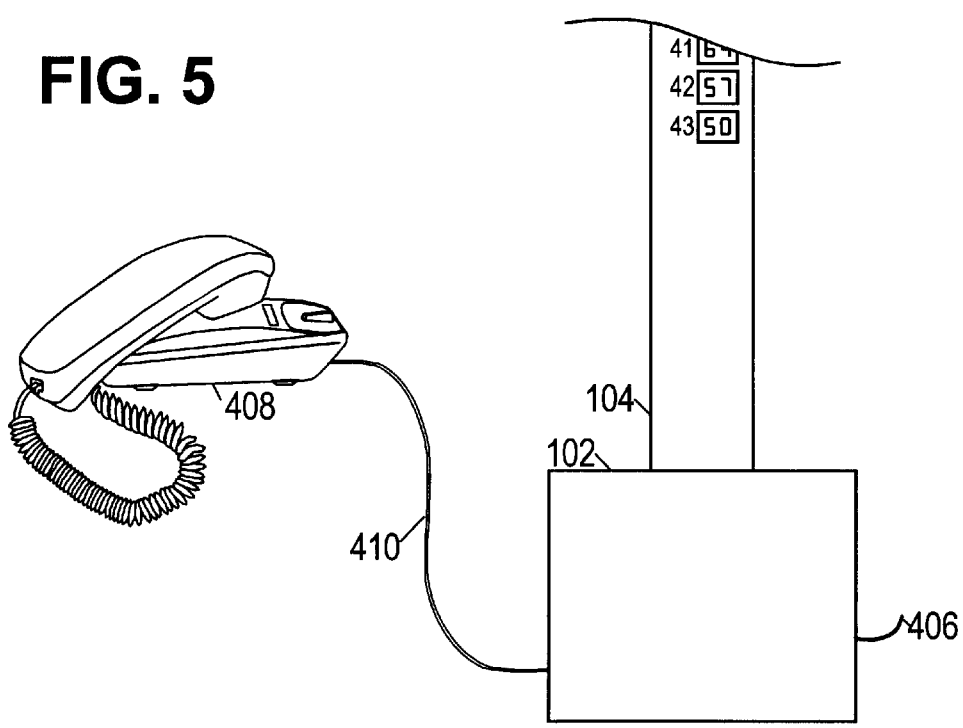
FIG. 5 shows a standings display in a second configuration.

FIG. 5 shows an alternate configuration of display 100 in which a phone 408 is coupled to a second phone jack in the display 100 by a second phone cable 410. When phone 408 or another phone on the same phone line is lifted in preparation for making a call, display 100 preferably terminates any existing connection and allows the call to be placed normally. Similarly, if display 100 detects a call-waiting signal, display 100 terminates any existing connection and allows the incoming call to proceed normally. The display 100 may be configured to automatically re-establish the connection after the completion of the call.

In one implementation, phone 408 may be used to initially configure display 100. Display 100 may be configured to listen for a dialed access code, and upon detecting this code, enter a programming mode. In this mode, display 100 may monitor touch tones and provide voice prompts to guide the user through the configuration process.

FIG. 6 shows a functional block diagram of an exemplary microcomputer which may be incorporated into display 100 for automated and programmable control. A system bus 602 couples a central processing unit 604 to a system memory 606 and a bus bridge 608. Central processing unit 604 loads software into memory 606 and retrieves software instructions from memory 606 for execution. In this manner, the software configures the central processing unit 604 to control the various other components to achieve a desired result: an operable standings display that can be updated regularly during a racing event.

Bus bridge 608 interfaces the system bus 602 with a peripheral or "I/O" bus 610. Via system bus 602, bus bridge 608, and I/O bus 610, the central processing unit 604 can access various system components such as a sound card 612, a video card 614, a display controller 616, an input/output (I/O) controller 618, a hard disk 626, a network interface card 628, a modem 630 and expansion slots 632. I/O controller 618 may provide access to a floppy drive 620, a keyboard 622, an infrared (IR) port 624, a serial port, and a parallel port.

When coupled to a speaker, sound card 612 may provide sound effects or reproduce a live audio feed. When coupled to a monitor, video card 614 provides visual information to a user to assist in system configuration. Display controller 616 is connected to the various display components 106–112 to provide the standings information as indicated by the processing unit 604. Floppy drive 620 may be used to upgrade the standings display software, to install software drivers for new components (e.g. the modem or NIC), and to save standings information for re-use at a later date. A keyboard 622 may be coupled to the I/O controller 618 to provide configuration information to processing unit 604. An infrared port 624 may be provided to receive control signals from a remote control 625. The serial and parallel ports may be coupled to a printer for printing out standings information.

A hard disk 626 is preferably provided for long term storage of software and configuration information. A flash ROM or other programmable storage device may also be used for this purpose. A network interface card 628 or a modem 630 is preferably provided for establishing a connection to an information server. The system preferably includes additional expansion slots 632 for future system expansion.

The standings information for a current race event, along with other race status information such as elapsed time, lap count, and flag status, is preferably maintained on a server coupled to the intenet. Standings display 100 preferably establishes a connection with the internet and accesses the server to retrieve the desired information. Such a connection may be made via a large area network (LAN or WAN) using the NIC 628. Alternatively, such a connection may be made using the modem 630 and an internet service provider (ISP). After the connection is established, the standings information is quickly retrieved. Thereafter, the standings display 100 may periodically retrieve updated information. Alternatively, the standings display 100 may register with the server, and the server may be programmed to transmit updates to all registered displays as changes occur.

Although standings display 100 is preferably configured with a microcomputer or microcontroller that automatically establishes a connection to an internet server to retrieve timely standings information during an event, standings display 100 may additionally or alternatively be configured to be manually operated. In a first such manual embodiment, the standings display 100 is configured to be controlled by a handheld remote control 625. The remote control 625 may communicate with the sensor 624 using infrared, ultrasonic, radio frequency, laser, or other wireless signals. The operator is able to use the remote control 625 to enter the desired information for display by standings display 100.

In a second such manual embodiment, the standings display provides backlit Plexiglas windows configured to illuminate clear plastic inserts. The plastic inserts may have printed alphanumeric characters that contrast well with the backlit Plexiglas windows. The operator then removes and inserts suitably marked inserts to display the desired information.

In a third such manual embodiment, the standings display is constructed as a "soft-sculpture", i.e. molded cloth-covered foam. Velcro may be used to secure opaque alphanumeric characters. The operator consequently removes and attaches suitably marked characters to display the desired information.

Numerous variations and modifications will become apparent to those skilled in the art once the above disclosure is fully appreciated. It is intended that the following claims be interpreted to embrace all such variations and modifications.

What is claimed is:

1. A standings display which comprises:
   a tower;
   an array of competitor number displays arranged vertically along the tower, wherein the competitor number displays are configurable to show competitor numbers in an order that indicates competitor positions during a race;
   a remote communications sensor configured to detect control signals from a remote control; and
   a controller coupled to the remote communications sensor and configured to set the competitor number displays according to the control signals received from the remote control.

2. The standings display of claim 1, further comprising:
   a time display configurable to show elapsed time during the race.

3. The standings display of claim 1, further comprising:
   a lap display configurable to show a number of laps completed during the race.

4. The standings display of claim 1, further comprising:
   a flag status display configurable to show a current race condition.

5. The standings display of claim 1, further comprising:
   a network interface card configurable to retrieve standings information from a server; and
   a controller coupled to the network interface card and configured to set the competitor number displays according to the standings information received from the server.

6. The standings display of claim 1, further comprising:
   a modem configurable to retrieve standings information from a server; and
   a controller coupled to the modem and configured to set the competitor number displays according to the standings information received from the server.

7. The standings display of claim 1, wherein the competitor number displays comprise seven-segment light emitting diode (LED) digits.

8. The standings display of claim 1, wherein the competitor number displays comprise LED pixels.

9. The standings display of claim 1, wherein the competitor number displays comprise backlit, translucent windows configured to hold clear overlays with opaque numerals.

10. The standings display of claim 1, wherein the competitor number displays comprise detachable numbers removably secured to the tower.

11. A standings display which comprises:
    a tower;
    an array of competitor number displays arranged vertically along the tower, wherein the competitor number displays are configurable to show competitor numbers in an order that indicates competitor positions during a race;
    a first phone jack configured to connect to a phone line;
    a second phone jack configured to connect to a telephone; and
    a controller coupled to the first and second phone jacks, wherein the controller is configured to establish a communications link with an information server via the phone line, and wherein the controller is configured to set the competitor number displays according to information received from the information server.

12. The standings display of claim 11, wherein the controller is further configured to terminate the communications link if the telephone generates an off-hook signal.

13. The standings display of claim 11, wherein the controller is further configured to terminate the communications link if a call-waiting signal is detected on the phone line.

14. A standings display which comprises:
    a tower;
    an array of competitor number displays arranged vertically along the tower, wherein the competitor number displays are configurable to show competitor numbers in an order that indicates competitor positions during a race;
    a computer configured to control the competitor number displays, wherein the computer includes:
      a display controller electrically connected to the competitor number displays to provide control signals that determine which numbers are displayed;
      a system memory configured to store a software program; and
      central processing unit coupled to the display controller to provide desired numbers for display, and coupled to the system memory to access the software program, wherein the software program configures the central processing unit to establish a connection to an information server, and wherein the software program configures the central processing unit to provide desired numbers to the display controller in response to information received from the information server.

* * * * *